US009493608B1

(12) United States Patent
McDaniel et al.

(10) Patent No.: US 9,493,608 B1
(45) Date of Patent: Nov. 15, 2016

(54) DMC CATALYZED ALKOXYLATION OF ESTERS

(71) Applicant: Covestro LLC, Pittsburgh, PA (US)

(72) Inventors: Kenneth G. McDaniel, Langhorne, PA (US); Rick L. Adkins, Canonsburg, PA (US); Don S. Wardius, Pittsburgh, PA (US)

(73) Assignee: Covestro LLC, Pittsburgh, PA (US)

( * ) Notice: Subject to any disclaimer, the term of this patent is extended or adjusted under 35 U.S.C. 154(b) by 0 days.

(21) Appl. No.: 14/976,007

(22) Filed: Dec. 21, 2015

(51) Int. Cl.
*C08G 65/26* (2006.01)

(52) U.S. Cl.
CPC ....... *C08G 65/2615* (2013.01); *C08G 65/2663* (2013.01)

(58) Field of Classification Search
CPC ............................... C08G 63/46; C08G 63/85
See application file for complete search history.

(56) References Cited

U.S. PATENT DOCUMENTS 4,792,620 A * 12/1988 Paulik .................. B01J 31/0231 560/232
5,817,844 A 10/1998 Hama et al.
6,184,400 B1 2/2001 Hama et al.
9,018,345 B2 * 4/2015 Kunst ................ C08G 65/2603 528/410
2008/0114086 A1 5/2008 Lorenz et al.
2013/0150601 A1 6/2013 Kolano et al.

FOREIGN PATENT DOCUMENTS

CN 1760169 A 4/2006

OTHER PUBLICATIONS

Zaragoza Dorwald, Side Reactions in Organic Synthesis, 2005, Wiley-VCH Verlag GmbH & Co. KGaA, Weinheim, Preface. p. IX.*
Almora-Barrios, ChemCatChem, Structure, Activity, and Deactivation Mechanisms in Double Metal Cyanide Catalysts for the Production of Polyols,2015, 7, pp. 928-935.*
Weerasooriya (Journal of Surfactants and Detergents, 1999, 2(3), pp. 373-381).*
Desrouches, Myriam et al; "From Vegetable Oils to Polyuerthanes: Synthetic Routes to Polyols and Main Industrial Products", Polymer Reviews, 52: pp. 38-72, 2012; Taylor and Francis Group LLC, publishers.
Weerasooriya, J., "Esteer Alkoxylation Technology"; Journal of Surfactants and Detergents ; pp. 373-381; vol. 2; No. 3; Jul. 1999.
Cox, M. F. and Weerosooriya, J.; "Methyl Ester Ethoxylates"; Am. Oil Chem. Soc. 74:847 ; pp. 847-859; (1997).

* cited by examiner

*Primary Examiner* — Paul A Zucker
(74) *Attorney, Agent, or Firm* — N. Denise Brown

(57) ABSTRACT

This invention relates to a novel process for preparing an aliphatic hybrid ester/ether polyol. This process simultaneously transesterifies and alkoxylates a mixture of at least one ester group containing compound which is free of ether groups, and at least one or more hydroxyl group containing compound which is free of ester groups; with the proviso that the mixture has an overall hydroxyl number of less than or equal to 350; with at least one alkylene oxide; in the presence of a mixture of catalysts. The catalyst mixture comprises at least one DMC catalyst, and at least one non-alkaline transesterification catalyst.

9 Claims, No Drawings

DMC CATALYZED ALKOXYLATION OF ESTERS

BACKGROUND

This invention relates to a process for preparing aliphatic hybrid ester/ether polyols. This process comprising simultaneously (A) transesterifying, and (B) alkoxylating (1) a mixture of (a) at least one ester group containing compound and (b) at least one hydroxyl group containing compound, with (2) one or more alkylene oxides, in the presence of (3) a mixture of catalysts that comprises (a) at least one DMC catalyst and (b) at least one non-alkaline transesterification catalyst. Such aliphatic hybrid ester/ether polyols can be used to produce polyurethane foams with a wide variety of cell structures, hardnesses and physical properties.

Polyether polyols are typically made from alkoxylating polyhydric hydroxyl-containing compounds with alkylene oxides such as propylene oxide (PO) and ethylene oxide (EO). Common polyether polyols which are useful for the production of polyurethane foam span a wide range of hydroxyl numbers from under 12 to over 900.

Polyester polyols are typically made from the condensation of one or more diacids or the anhydrides thereof, with dialcohols, though mixed or higher functionality may be employed for either the acid or alcohol containing compounds. In some cases reactants employed may contain both acid and alcohol functional groups in a single monomer compound. To be made well, polyester polyols require careful control of the addition of the reactants and precise dehydration to drive the esterification reaction to completion. Polyester polyols useful for the production of polyurethane foams may span a wide range of hydroxyl numbers from under 10 to over 700.

Very thorough reviews of the processes and products which have been investigated and developed to date for polyether and polyester polyols are provided in the monograph by Mihail Ionescu entitled "Chemistry and Technology of Polyols for Polyurethanes" (Rapra Technology Ltd., 2005); and for the polyols made by various reactions of acyl triglycerides, e.g., vegetable oils, in the review paper by Myriam Desrouches, et. al. called "From Vegetable Oils to Polyurethanes: Synthetic Routes to Polyols and Main Industrial Products," (Polymer Reviews, 52: 38-72, 2012; Taylor and Francis Group LLC, publishers).

An object of the present invention was to overcome the limitations in the prior art and to provide an effective and efficient process for preparing aliphatic hybrid ester/ether polyols. A process which simultaneously transesterifies and alkoxylates a mixture of ester group containing compounds and hydroxyl group containing compounds with alkylene oxides using a dual catalyst system is not described in the prior art. It has been found that the process described herein forms aliphatic hybrid ester/ether polyols which do not require work-up and do not contain catalyst residues in the system that interfere with polyol-isocyanate reactions. The catalysts required by the novel process are essentially "pH-neutral" and, as such, do not interfere with urethane catalysis in flexible foams.

SUMMARY OF THE INVENTION

This invention relates to a process for the preparation of an aliphatic hybrid ester/ether polyol. This process comprises simultaneously:

(A) transesterifying, and (B) alkoxylating (1) a mixture comprising:

(a) at least one ester group containing compound which is free of ether groups, and is selected from the group consisting of triacylglycerols, fatty acid esters, fatty acid polyesters, alkyl esters, alkylene di-esters, alkylene tri-esters, alkylene polyesters and mixtures thereof;

and, (b) at least one hydroxyl group containing compound which is free of ester groups, and is selected from the group consisting of alcohols, polyols, polyether polyols, hyperbranched polyols and mixtures thereof;

with the proviso that the mixture has an overall hydroxyl number of less than or equal to 350;

with (2) at least one alkylene oxide;

in the presence of (3) a mixture of catalysts comprising (a) at least one DMC catalyst, and (b) at least one non-alkaline transesterification catalyst.

DETAILED DESCRIPTION OF THE INVENTION

The present invention will now be described for purposes of illustration. Except in the operating examples, or where otherwise indicated, all numerical parameters are to be understood as being prefaced and modified in all instances by the term "about", in which the numerical parameters possess the inherent variability characteristic of the underlying measurement techniques used to determine the numerical value of the parameter. Examples of such numerical parameters include, but are not limited to hydroxyl numbers (OH numbers), equivalent and/or molecular weights, functionalities, amounts, percentages, etc. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited herein is intended to include all sub-ranges subsumed within the recited range. For example, a range of "1 to 10" is intended to include all sub-ranges between (and including) the recited minimum value of 1 and the recited maximum value of 10, that is, having a minimum value equal to or greater than 1 and a maximum value equal to or less than 10. All end points of any range are included unless specified otherwise. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are inherently described in this specification such that amending to expressly recite any such sub-ranges would comply with the requirements of 35 U.S.C. §112 and 35 U.S.C. §132(a).

The grammatical articles "a", "an", and "the", as used herein, are intended to include "at least one" or "one or more", unless otherwise indicated, even if "at least one" or "one or more" is used in certain instances. By way of example, and without limitation, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

Equivalent weights and molecular weights given herein in Daltons (Da) are number average equivalent weights and number average molecular weights respectively, unless indicated otherwise.

Isocyanate index is the relative stoichiometric amount of isocyanate functional groups necessary to react with the isocyanate reactive groups present in the overall foam formulation. It is expressed as a percentage in this application; thus equal stoichiometric amounts of isocyanate functional groups and isocyanate reactive functional groups in the formulation provides an isocyanate index of 100%.

The present invention requires (1) a mixture comprising:

(a) at least one ester group containing compound that is free of ether groups, and is selected from the group consisting of triacylglycerols, fatty acid esters, fatty acid polyesters, alkyl esters, alkylene di-esters, alkylene tri-esters, alkylene polyesters and mixtures thereof;

and (b) at least one hydroxyl group containing compound which is free of ester groups, and is selected from the group consisting of alcohols, polyols, polyether polyols, hyperbranched polyols and mixtures thereof;

with the proviso that the overall mixture has an overall hydroxyl number of less than or equal to 350, preferably less than or equal to 325.

Suitable ester group containing compounds which are free of ether groups to be used as component (1)(a) are selected from the group consisting of triacylglycerols, fatty acid esters, fatty acid polyesters, alkyl esters, alkylene di-esters, alkylene tri-esters, alkylene polyesters and mixtures thereof. Suitable ester group containing compounds may be obtained from renewable or non-renewable natural resources or from the refining/re-processing or recycling of post-consumer or post-industrial waste streams.

Suitable triacylglycerols comprise the esterification product of glycerol with any three fatty acids. As used herein, a fatty acid refers to an organic acid made up of molecules containing a carboxyl group at the end of a hydrocarbon chain. The fatty acid components of the triacylglycerols can have chains of varying lengths. More specifically, the carbon content of the fatty acid may vary from 2 to 34 carbons. Some non-limiting examples of suitable fatty acids include butyric acid, lauric acid, myristic acid, pentadecanoic acid, palmitic acid, palmitoleic acid, heptadecanoic acid, heptadecanoic acid, stearic acid, oleic acid, caproic acid, linoleic acid, linolenic acid, eicosenoic acid, behenic acid and erucic acid. The same or different fatty acids maybe used to esterify the glycerol and form the triacylglycerols. Preferred triacylglycerols are esterification products of glycerol with a fatty acid selected from the group consisting of oleic acid, stearic acid, lauric acid, and linoleic acid.

Suitable fatty acid esters to be used as component (1)(a) are esters formed by the reaction of a fatty acid with an alcohol, and include compounds such as methyl caproate, methyl butyrate, methyl laurate, methyl stearate including, the methyl ester of acetic acid, as well as methyl oleate, methyl linoleate, etc. Preferred fatty acid esters for the invention include methyl caprylate, methyl laurate, methyl stearate, etc.

Fatty acid polyesters and alkylene polyesters to be used as component (1)(a) of the invention includes compounds such as polyesters made from any the following aliphatic diacids: succinic, adipic, sebacic, decanoic, dodecanoic, or azelaic acids. Polycaprolactones of both functionality two, three or higher would also be included. Such polyester polyols could be made with a wide variety of glycol components and would include, for example, polybutylene succinate, 1,3 propanediol adipate, and similar aliphatic polyester polyols. Preferred fatty acid polyesters and alkylene polyesters include polybutylene succinate and polyethylene adipate.

Suitable alkyl esters for component (1)(a) include compound such as methyl caproate, methyl butyrate, methyl laurate, methyl stearate, and also includes the methyl ester of acetic acid, methyl oleate, methyl linoleate, etc. Preferred alkyl esters include methyl caprylate, methyl laurate, methyl stearate, ethyl caprylate, etc.

Suitable alkylene diesters, alkylene triesters and alkylene polyesters for component (1)(a) include compound such as dimethyl malonate, diethyl malonate, dimethyl adipate, diethyl adipate, dimethyl fumarate, trimethyl-1,2,3-propanetricarboxylate, etc. Preferred alkylene diesters, alkylene triesters and alkylene polyesters include dimethyl malonate, dimethyl adipate, diethyl adipate, etc.

Preferred compounds to be used as component (a) of the mixture include soybean oil, palm oil, palm kernel oil, rapeseed oil, canola oil, cottonseed oil, and any similar triacyl glyceride derived from plant or animal matter.

Component (b) of the mixture comprises at least one hydroxyl group containing compound which is free of ester groups, and which is selected from the group consisting of alcohols, polyols, polyether polyols, hyperbranched polyols and mixtures thereof. Suitable compounds which contain at least one hydroxyl group and are free of ester groups will typically have number average molecular weights of less than 2000, or of less than 1500, or of less than 1000.

Some examples of suitable alcohols include methanol, ethanol, propanol, butanol, pentanol, hexanol, heptanol, octanol, decanol, dodecanol, tetradecanol, octadecanol, etc. Also suitable are blends of alcohols such as Neodol® 25 which is a blend of $C_{12}$, $C_{13}$, $C_{14}$ and $C_{15}$ high purity primary alcohols commercially available from Shell Chemical, Neodol® 91 which is a blend of $C_9$, $C_{10}$ and $C_{11}$ high purity primary alcohols commercially available from Shell Chemical, and Neodol® 23 which is a blend of $C_{12}$ and $C_{13}$ high purity primary alcohols commercially available from Shell Chemical, etc. Preferred alcohols are Neodol 23 and Neodol 25.

Polyols suitable for component (b) herein have a functionality of from about 2 to about 8. Examples of suitable polyols for component (b) include glycols, glycerols, water, trimethylolethane, trimethylolpropane, pentaerythritol, sucrose, sorbitol, α-methylglucoside, mannitol, hydroxymethylglucoside, hydroxypropylglucoside, 1,4-cyclohexanediol, cyclohexanedimethanol, hydroquinone, resorcinol and the like. Examples of suitable glycols or dihydric alcohols include but are not limited to compounds such as ethylene glycol, propylene glycol, 1,3-butanediol, 1,4-butanediol, 2,3-butanediol, diethylene glycol, dipropylene glycol, dibutylene glycol, triethylene glycol, tripropylene glycol, neopentyl glycol, etc. Some examples of suitable glycerols include glycerol, trimethylolpropane, pentaerythritol, etc. Preferred polyols for component (b) include propylene glycol, dipropylene glycol, triethylene glycol, glycerol, sucrose, sorbitol, trimethylolpropane, etc.

Suitable polyether polyols for component (b) of the present invention are characterized by a functionality of from about 2 to about 8. Examples of suitable polyether polyols include, for example, those compounds which are conveniently made by reacting starter compounds having two or more active hydrogens (e.g., diols or glycols, triols, tetrols, hexols, etc. and other polyfunctional starters known to those skilled in the art) with one or more equivalents of an epoxide such as ethylene oxide, propylene oxide, butylene oxides, styrene oxides, epichlorohydrin and cyclic ethers such as tetrahydrofuran, or mixtures thereof. The epoxide can be polymerized with the starter compounds using various well-known techniques and a variety of catalysts, including alkali metals, alkali metal hydroxides and alkoxides, double metal cyanide complexes, and many others. The preferred starter compounds for polyether polyols include glycerin, sorbitol, sucrose, etc. These polyether polyols can be EO homopolymers, PO homopolymers, block EO-PO copolymers, EO-capped polyoxypropylenes, PO capped polyoxyethylenes, random EO/PO copolymers, PO polymers that are "tipped" with a mixture of EO and PO to achieve the desired amount of copolymerized oxyethylene, copolymerized oxypropylene, or any other desired configuration.

Hyperbranched polyols which can be used as component (b) may have a functionality of from about 9 to about 15. Suitable hyperbranched polyols for component (b) of the mixture (1) in the invention include, for example, hyperbranched polyether polyols formed by reacting epoxy alcohols in the presence of one or more phosphines as disclosed in U.S. Pat. No. 9,096,713, the disclosure of which is herein incorporated by reference; hyperbranched polyol compounds having at least two hydroxyl groups available to react, such as dendrimers, hyperbranched macromolecules and other dendron-based architectures as disclosed in U.S. Pat. No. 8,647,611 and U.S. Pat. No. 7,754,824, the disclosures of which are herein incorporated by reference; etc.

In accordance with the present invention, component (b) is preferably one or more of: glycerol, sucrose, sorbitol, polyglycerine or its oligomers and mixtures, trimethylolpropane, triethylene glycol dipropylene glycol, propylene glycol or mixtures thereof.

Suitable alkylene oxides for component (2) of the presently claimed process include ethylene oxide, propylene oxide, butylene oxide, styrene oxide, epichlorohydrin, etc. Mixtures of alkylene oxides may also be used herein. Alkylene oxides can be used sequentially or simultaneously. Preferred alkylene oxides for the invention include ethylene oxide and/or propylene oxide.

The mixture of catalysts (3) comprises (a) at least one DMC catalyst and (b) at least one non-alkaline transesterification catalyst.

Suitable double metal cyanide (DMC) catalysts (3)(a) include both crystalline catalysts and non-crystalline (i.e. substantially amorphous) catalysts. Crystalline DMC catalysts are known and described in, for example, U.S. Pat. No. 6,303,833 and U.S. Pat. No. 6,303,533, the disclosures of which are herein incorporated by reference.

It is preferred that the DMC catalysts exhibit a substantially non-crystalline character (substantially amorphous) such as disclosed in U.S. Pat. No. 5,482,908 and U.S. Pat. No. 5,783,513, the entire contents of which are incorporated herein by reference thereto. These catalysts show significant improvements over the previously studied catalysts because the amounts of by-product cyclic carbonates are low. Thus, there is a clear advantage to using substantially non-crystalline DMC catalysts for the production of these polycarbonates, because of the lower amounts of propylene carbonate produced than the catalysts and processes in U.S. Pat. Nos. 4,500,704 and 4,826,953.

The catalysts disclosed in U.S. Pat. No. 5,482,908 and U.S. Pat. No. 5,783,513 differ from other DMC catalysts because these catalysts exhibit a substantially non-crystalline morphology. In addition, these catalysts are based on a combination of ligands, such as t-butyl alcohol and a polydentate ligand (polypropylene oxide polyol).

Examples of double metal cyanide compounds that can be used in the invention include, for example, zinc hexacyanocobaltate(II), zinc hexacyano-ferrate(III), nickel hexacyanoferrate(II), cobalt hexacyano-cobaltate(III), and the like. Further examples of suitable double metal cyanide complexes are listed in U.S. Pat. No. 5,158,922, the teachings of which are incorporated herein by reference. Zinc hexacyanocobaltate(II) is preferred.

The solid DMC catalysts of the invention include an organic complexing agent. Generally, the complexing agent must be relatively soluble in water. Suitable complexing agents are those commonly known in the art, as taught, for example, in U.S. Pat. No. 5,158,922. The complexing agent is added either during preparation or immediately following precipitation of the catalyst. Usually, an excess amount of the complexing agent is used. Preferred complexing agents are water-soluble heteroatom-containing organic compounds that can complex with the double metal cyanide compound. Suitable complexing agents include, but are not limited to, alcohols, aldehydes, ketones, ethers, esters, amides, ureas, nitriles, sulfides, and mixtures thereof. Preferred complexing agents are water-soluble aliphatic alcohols selected from the group consisting of ethanol, isopropyl alcohol, n-butyl alcohol, isobutyl alcohol, sec-butyl alcohol, and tert-butyl alcohol. Tert-butyl alcohol is particularly preferred.

The solid DMC catalysts of the invention include from about 5 to about 80 wt. %, based on amount of catalyst, of a polyether having a number average molecular weight greater than about 500. Preferred catalysts include from about 10 to about 70 wt. % of the polyether; most preferred catalysts include from about 15 to about 60 wt. % of the polyether. At least about 5 wt. % of the polyether is needed to significantly improve the catalyst activity compared with a catalyst made in the absence of the polyether. Catalysts that contain more than about 80 wt. % of the polyether generally are no more active, and they are impractical to isolate and use because they are typically sticky pastes rather than powdery solids.

Suitable polyethers include those produced by ring-opening polymerization of cyclic ethers, and include epoxide polymers, oxetane polymers, tetrahydrofuran polymers, and the like. Any method of catalysis can be used to make the polyethers. The polyethers can have any desired end groups, including, for example, hydroxyl, amine, ester, ether, or the like. Preferred polyethers are polyether polyols having average hydroxyl functionalities from about 2 to about 8 and number average molecular weights within the range of about 1000 to about 10,000, more preferably from about 1000 to about 5000. These are usually made by polymerizing epoxides in the presence of active hydrogen-containing initiators and basic, acidic, or organometallic catalysts (including DMC catalysts). Useful polyether polyols include poly(oxypropylene) polyols, EO-capped poly(oxypropylene) polyols, mixed EO-PO polyols, butylene oxide polymers, butylene oxide copolymers with ethylene oxide and/or propylene oxide, polytetramethylene ether glycols, and the like. Polyethylene glycols are generally not useful in the invention. In one embodiment, the poly(oxypropylene) polyols, may be specifically diols and/or triols having number average molecular weights within the range of about 2000 to about 4000.

The catalysts of the invention are characterized by any suitable means. The polyether and organic complexing agent are conveniently identified and quantified, for example, using thermogravimetric and mass spectral analyses. Metals are easily quantified by elemental analysis.

The catalysts of the invention can also be characterized using powder X-ray diffraction. The catalysts exhibit broad lines centered at characteristic d-spacings. For example, a zinc hexacyanocobaltate catalyst made using tert-butyl alcohol and a poly(oxypropylene) diol of about 4000 molecular weight has two broad signals centered at d-spacings of about 5.75 and 4.82 angstroms, and a somewhat narrower signal centered at a d-spacing of about 3.76 angstroms. This diffraction pattern is further characterized by the absence of sharp lines corresponding to highly crystalline zinc hexacyanocobaltate at d-spacings of about 5.07, 3.59, 2.54, and 2.28 angstroms.

The DMC catalyst concentration in the inventive process is chosen to ensure a good control of the polyoxyalkylation reaction under the given reaction conditions. The catalyst concentration is at least 0.001 wt. % or higher, at least about 0.0024 wt. % or higher, or at least about 0.0025 wt. % or higher. The catalyst concentration is also typically less than or equal to about 0.2 wt. %, or less than or equal to about 0.1 wt. %, or less than or equal to about 0.06 wt. %. Thus, the catalyst concentration may range from about 0.001 wt. % to about 0.2 wt. %, or in the range from about 0.0024 wt. % to about 0.1 wt. %, or in the range of from about 0.0025 to about 0.06 wt. %, based on the weight of the polyol produced. The substantially non-crystalline DMC catalyst may be present in an amount ranging between any combination of these values, inclusive of the recited values.

Suitable non-alkaline transesterification catalysts (3)(b) include catalysts such as, for example, acetic acid, phosphoric acid, p-toluenesulfonic acid, methanesulfonic acid, tetrabutyl titanate, tetra-2-ethylhexyltitanate, stannous octoate, bis(dibutylchlorotin)oxide, etc. Mixtures of these catalysts can also be used. Preferred non-alkaline transesterification catalyst for the invention are tetra-2-ethylhexyltitanate and tetrabutyl titanate.

In accordance with the present invention, all components including the DMC and transesterification catalyst can be combined and the system activated.

The process of the present invention comprises reacting a mixture of an ester containing starter and a hydroxyl containing starter, with alkylene oxide in the presence of a DMC alkoxylation catalyst and a transesterification catalyst. In accordance with the present invention, the DMC alkoxylation catalyst may be pre-activated. The DMC alkoxylation catalysts may also be activated in the presence of all components and the transesterification catalyst.

A typical procedure for the insertion of alkylene oxides into esters is given below. The process may be conducted in, for example, a 1.5-liter pressure reactor that is equipped with:

1. process control with the capability for shutdown if any of the temperature, pressure or feed parameters move outside of established limits;
2. feed systems for ethylene oxide (EO) and/or propylene oxide (PO) (or other desired oxides);
3. vacuum capability; and
4. various pressure, temperature etc. devices and gauges.

In general, the starting materials and DMC catalyst are charged to the reactor and stripped for about 30 minutes at a temperature in the range of about 100° C. to about 130° C. with a nitrogen sparge. Vacuum is optional but may be used if desired. The reactor contents are heated (to a temperature of about 100° C. to about 150° C.), and oxide is added to initiate the catalyst. After initiation of the DMC catalyst, the transesterification catalyst is added and the remaining oxide is fed to the reactor at a temperature of between about 130° C. to about 170° C. Residual oxide is digested after the oxide feed for approximately 30 minutes to 60 minutes. Vacuum stripping is optional but if done, it is typically for between 20 and 30 minutes.

When desired, the transesterification catalyst can be added at the same time as the DMC catalyst prior to activation with oxide.

As will be appreciated by the foregoing description, the present invention is directed, in certain embodiments, to a process for preparing an aliphatic hybrid ester/ether polyol, comprising simultaneously (A) transesterifying, and (B) alkoxylating (1) a mixture comprising: (a) at least one ester group containing compound which is free of ether groups, and is selected from the group consisting of triacylglycerols, fatty acid esters, fatty acid polyesters, alkyl esters, alkylene di-esters, alkylene tri-esters, alkylene polyesters and mixtures thereof; and, (b) at least one or more hydroxyl group containing compound which is free of ester groups, and is selected from the group consisting of alcohols, polyols, polyether polyols, hyperbranched polyols and mixtures thereof; with the proviso that said mixture has an overall hydroxyl number of less than or equal to 350; with (2) at least one alkylene oxide; in the presence of (3) a mixture of catalysts comprising (a) at least one DMC catalyst, and (b) at least one non-alkaline transesterification catalyst.

In certain embodiments, the present invention is directed to the process of preparing aliphatic ester/ether polyols of the previous paragraph, wherein (1) the mixture has an overall hydroxyl number of less than or equal to 325.

In certain embodiments, the present invention is directed to the process of preparing aliphatic ester/ether polyols of the previous two paragraphs, wherein (2) the alkylene oxide comprises ethylene oxide, propylene oxide or mixtures thereof.

In certain embodiments, the present invention is directed to the process of preparing aliphatic ester/ether polyols of the previous three paragraphs, wherein (1)(a) the ester group containing compound comprises methyl caprylate, methyl laurate, methyl stearate, dimethyl malonate, dimethyl adipate, soybean oil, palm oil, or mixtures thereof.

In certain embodiments, the present invention is directed to the process of preparing aliphatic ester/ether polyols of the previous four paragraphs, wherein (1)(b) the hydroxyl group containing compound comprises (i) an alcohol comprising a blend of $C_{12}$-$C_{15}$ high purity alcohols, (ii) a blend of $C_9$-$C_{11}$ high purity primary alcohols, (iii) a blend of $C_{12}$-$C_{13}$ high purity primary alcohols, (iv) a polyol having a functionality of 2 to 8, (v) a polyether polyol polyol having a functionality of 2 to 8 and a molecular weight of less than 2000, or (vi) mixtures thereof.

In certain embodiments, the present invention is directed to the process of preparing aliphatic ester/ether polyols of the previous five paragraphs, wherein (3)(a) the DMC catalyst comprises an amorphous DMC catalyst.

In certain embodiments, the present invention is directed to the process of preparing aliphatic ester/ether polyols of the previous six paragraphs, wherein (3)(b) the transesterification catalyst comprises tetra-2-ethylhexyltitanate, tetrabutyl titanate or mixtures thereof.

In certain embodiments, the present invention is directed to the process of preparing aliphatic ester/ether polyols of the previous seven paragraphs, wherein (3)(a) the DMC catalyst and (3)(b) the transesterification catalyst are added at the same time.

In certain embodiments, the present invention is directed to the process of preparing aliphatic ester/ether polyols of the previous eight paragraphs, wherein (3)(a) the DMC catalyst is added before (3)(b) the transesterification catalyst.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

The following materials were used in the working examples:

Ester A: methyl caprylate, 99% purity

Ester B: soybean oil, commercially available from Cargill

Alcohol A: a C13 monol, commercially available from Shell Chemical as Neodol® 25

Polyol A: a propoxylated sorbitol polyol having a functionality of 6, a number average molecular weight of about 1685 and an OH number of about 200

Polyol B: a glycerine started polyether polyol having a functionality of 3, an OH number of 56 and contains about 8% by weight of ethylene oxide (based on 100% by weight of the alkylene oxide content)

EO: ethylene oxide

Catalyst A: an amorphous double metal cyanide (DMC) catalyst, similar to those disclosed in Examples 2 and 3 of U.S. Pat. No. 5,482,908

Catalyst B: tetra-2-ethylhexyltitanate, commercially available as Tyzor TOT® from Dorf Ketal Specialty Catalyst C: tin octoate, commercially available under the name Dabco T-9

Catalyst D: triethylenediamine in dipropylene glycol, commercially available under the name NIAX C-183

Surfactant A: a silicone surfactant, commercially available under the name NIAX L-635

Isocyanate A: toluene diisocyanate comprising 80% by weight of the 2,4-isomer and 20% by weight of the 2,6-isomer

Example 1

Procedure 150 grams of Ester A, 10 grams of Alcohol A and 29 mg (i.e. 50 ppm) of Catalyst A were charged to a 1.5 L stainless steel reactor vessel. The contents were stripped for about 30 mins at about 120° C. with nitrogen sparge and no vacuum. The contents were heated to about 150° C. while about 30 psia nitrogen was added. 13 g ethylene oxide (EO) was added to activate Catalyst A. After digesting EO to baseline psia, the contents of the reactor were stripped to obtain a partial vacuum on the reactor. A solution of 0.584 g Catalyst B dissolved in 5 mL Ester A was added to the reactor, and nitrogen was charged to give a total of about 30 psia of nitrogen. A total of 416 g of EO were charged to the reactor over a period of about 4 hours at about 150° C. After completion of the EO addition, the reactor contents were heated at about 150° C. for about 20 minutes to allow the EO pressure to reach the baseline, followed by stripping for about 20 mins. at about 130° C. The product was removed from the reactor. GPC analysis showed complete conversion of methyl ester, and the NMR analysis was consistent with a product having a terminal methyl-ether group (i.e. an O-Me ether) and with a polyethylene oxide chain. The final product had a polydispersity of 1.13.

Example 2

1944 grams of Polyol A, 968 grams of Ester B and 0.42 g (i.e. 60 ppm) of Catalyst A were charged to a 1.5 L stainless steel reactor vessel. The contents were stripped for about 30 mins at a temperature of about 130° C. 169 grams of propylene oxide (PO) and 35 g of ethylene oxide were added to activate Catalyst A. After catalyst activation and digestion of PO and ethylene oxide (EO) to baseline, nitrogen was added to atmospheric pressure. A vacuum was applied to reduce the pressure to about 100 mm. Catalyst B (35 mL) was added to the reactor. Vacuum was applied to reduce the reactor pressure to about 100 mm. A total of 3337 grams of PO and 694 g of EO were charged to the reactor over a period of about 4 hours at a temperature of about 170° C. as fast as possible. After completion of the PO and EO addition, the reactor contents were heated at about 170° C. for about 30 minutes to allow the reactor pressure to reach the baseline. This was followed by stripping under full vacuum starting at a temperature of about 170° C. and cooling to about 50° C., then adding 1000 ppm of Vitamin E (i.e. a standard antioxidant for polyols).

The product of Example 2 had an OH number of about 64, a viscosity of about 516 cks at 25° C. and a polydispersity of about 1.36.

Example 3

1766 grams of Polyol A, 177 mg of phosphoric acid, 876 grams of Ester B and 0.42 g (i.e. 60 ppm) of Catalyst A were charged to a 1.5 L stainless steel reactor vessel. The contents were stripped for 30 mins at 130° C. with a nitrogen sparge. The reactor was evacuated, and 150 grams of propylene oxide and 60 g of ethylene oxide were added to activate Catalyst A. After catalyst activation and digestion of PO and EO to baseline, nitrogen was added to atmospheric pressure. Catalyst B (35 mL) was added to the reactor. Vacuum was applied to reduce the reactor pressure to about 100 mm. A total of 3054 grams of PO and 1241 g of EO were charged to the reactor over a period of 6 hours at 1700° C. as fast as possible. After completion of the PO and EO addition, the reactor contents were heated at 170° C. for 30 minutes to allow the reactor pressure to reach the baseline. This was followed by stripping under full vacuum starting at 1700° C. and cooling to about 50° C., then adding 1000 ppm of Vitamin E antioxidant (i.e. a standard antioxidant for polyols).

The product had an OH number of about 56.4, a viscosity of about 695 cks at 25° C. and a polydispersity of about 1.59.

Example 4

Polyol X was Prepared as Follows

Polyol A (1773 grams) was charged to a two gallon stainless steel reactor followed by 701 grams of Ester B, 177 mg of phosphoric acid and 0.42 grams of Catalyst A. The reactor was stripped at about 130° C. for about 30 minutes and 132 grams of PO and 68 grams of EO were added for catalyst activation. Catalyst B (35 ml) was charged and vacuum was applied to reduce the reactor pressure to about 100 mm. The system was heated to about 170° C. and a total of 2986 grams of propylene oxide and 1540 grams of ethylene oxide were added over a period of about six hours. This was followed by stripping under full vacuum for about 30 minutes. The product had an OH number of 58.6, a viscosity of about 940 cks at 25° C. and a polydispersity of about 1.72.

Polyol X was then evaluated in TDI polyurethane foams formulations. The results are set forth in Table 1.

TABLE 1

Evaluation of Polyol X in Flexible Polyurethane Foam

| Component | Example 5 | Example 6 |
|---|---|---|
| Polyol B | 100 | |
| Polyol X | | 100 |
| Water (distilled) | 4.2 | 4.2 |
| Surfactant A | 1.2 | 1.2 |
| Catalyst C | 0.22 | 0.34 |
| Catalyst D | 0.15 | 0.2 |
| Isocyanate A | 51.81 | 52.25 |
| Index (100 A/B) | 105 | 105 |
| Shrinkage | Nil | Nil |
| Cell Structure | Fine (A) | Fine (A) |

| Test Details | Units | Control | Polyol X |
|---|---|---|---|
| Density | lb/ft$^3$ | 1.51 | 1.52 |
| Resilience | % | 33 | 27 |
| IFD 25% | lb/50 in$^2$ | 28 | 25 |
| IFD 65% | lb/50 in$^2$ | 59 | 55 |
| S.F. 65%/15% | | 2.08 | 2.21 |
| Wet Set 50% | % | 18.71 | 21.27 |

In which "S.F." means Support Factor.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing an aliphatic hybrid ester/ether polyol, comprising simultaneously (A) transesterifying, and (B) alkoxylating (1) a mixture comprising:

(a) one or more ester group containing compounds which are free of ether groups, and are selected from the group consisting of triacylglycerols, fatty acid esters, fatty acid polyesters, alkyl esters, alkylene di-esters, alkylene tri-esters, alkylene polyesters and mixtures thereof;

and, (b) one or more hydroxyl group containing compounds which are free of ester groups, and are selected from the group consisting of alcohols, polyols, polyether polyols, hyperbranched polyols and mixtures thereof;

with the proviso that said mixture has an overall hydroxyl number of less than or equal to 350;

with (2) one or more alkylene oxides;

in the presence of (3) a mixture of catalysts comprising (a) one or more DMC catalysts, and (b) one or more non-alkaline transesterification catalysts.

2. The process of claim 1, wherein (1) said mixture has an overall hydroxyl number of less than or equal to 325.

3. The process of claim 1, wherein (2) said one or more alkylene oxides comprise ethylene oxide, propylene oxide or mixture thereof.

4. The process of claim 1, wherein (1)(a) said one or more ester group containing compounds comprise methyl caprylate, methyl laurate, methyl stearate, dimethyl malonate, dimethyl adipate, soybean oil, palm oil, or mixtures thereof.

5. The process of claim 1, wherein (1)(b) said one or more hydroxyl group containing compounds comprise (i) an alcohol comprising a blend of $C_{12}$-$C_{15}$ high purity primary alcohols, (ii) a blend of $C_9$-$C_{11}$ high purity primary alcohols, (iii) a blend of $C_{12}$-$C_{13}$ high purity primary alcohols, (iv) a polyol having a functionality of 2 to 8, (v) a polyether polyol having a functionality of 2 to 8 and a molecular weight of less than 2000, or (vi) mixtures thereof.

6. The process of claim 1, wherein (3)(a) said one or more DMC catalysts comprise an amorphous DMC catalyst.

7. The process of claim 1, wherein (3)(b) said one or more transesterification catalysts comprise tetra-2-ethylhexyltitanate, tetrabutyl titanate or mixtures thereof.

8. The process of claim 1, wherein (3)(a) said one or more DMC catalysts and (3)(b) said one or more transesterification catalysts are added at the same time.

9. The process of claim 1, wherein (3)(a) said one or more DMC catalysts is added before (3)(b) said one or more transesterification catalysts.

* * * * *